United States Patent [19]

Schowalter

[11] 3,994,347
[45] Nov. 30, 1976

[54] DRAFT CONTROL SYSTEM WITH CONTROL VALVE

[75] Inventor: Lewis G. Schowalter, Racine, Wis.

[73] Assignee: J. I. Case Company, Racine, Wis.

[22] Filed: Mar. 10, 1975

[21] Appl. No.: 556,589

[52] U.S. Cl. .................................. 172/9; 91/459; 137/625.68
[51] Int. Cl.² .................................. A01B 63/112
[58] Field of Search .................... 172/1, 2, 3, 4, 4.5, 172/7, 8, 9, 10, 11, 12; 91/361, 362, 363 R, 363 A, 459; 137/596.16, 596.2, 625.68

[56] References Cited
UNITED STATES PATENTS

| 2,836,196 | 5/1958 | Gunn | 137/596.16 |
| 2,851,938 | 9/1958 | Giertz et al. | 172/8 |
| 3,229,391 | 1/1966 | Breitbarth et al. | 172/4.5 |
| 3,235,010 | 2/1966 | North | 172/7 |
| 3,516,498 | 6/1970 | Schowalter | 172/9 |
| 3,744,374 | 7/1973 | Schneider et al. | 91/363 R |

Primary Examiner—Richard T. Stouffer
Attorney, Agent, or Firm—Dressler, Goldsmith, Clement Gordon & Shore, Ltd.

[57] ABSTRACT

A control valve that forms part of a draft control system is disclosed herein. The control valve is designed to raise the implement with respect to the vehicle at one rate of speed and automatically increase the rate of raising the implement when a predetermined magnitude of change of position is required.

5 Claims, 6 Drawing Figures

DRAFT CONTROL SYSTEM WITH CONTROL VALVE

BACKGROUND OF THE INVENTION

The present invention relates to an improved control valve for use in an electronic draft control system of the type disclosed in L. G. Schowalter U.S. Pat. No. 3,516,498, issued June 23, 1970 assigned to the assignee of the present invention.

One of the most common present day systems for connecting an implement to a tractor is known as a three-point hitch. The three-point hitch consists of a pair of draft arms that provide the connection between the implement and the vehicle with a rock arm connected to a rock shaft and to the draft arms to position the draft arms with respect to the tractor. The rock shaft is positioned by a hydraulic motor connected thereto with the flow of hydraulic fluid to and from the motor being controlled by a control valve.

In the above mentioned patent, the control valve is actuated by an electronic signal which is produced by an electronic control circuit that receives signals from the three variables that are incorporated into the draft control system. These three variables include a positional setting of the draft arms which is accomplished through a manual setting of a control lever and actuation of the hydraulic motor to reposition the rock shaft and result in a desired position for the draft arms.

One of the problems encountered with a system that is controlled electronically is that there is no provision that can be made for varying the speed of raising and/or lowering the implement. Most valves that are electronically or solenoid operated are of the "on-off" type and, thus, no provision is made for varying the flow of fluid to and from the hydraulic motor.

While there are known electrically operated valves wherein the flow of fluid therethrough can be changed, these valves are normally extremely complicated in construction having numerous parts, all of which substantially increases the cost thereof and also increases the maintenance required.

SUMMARY OF THE INVENTION

According to the present invention, a simple control valve, which forms part of a draft control system, has a minimum number of moving parts while still being capable of varying the flow to a fluid operated device.

More specifically, the control valve of the present invention is specifically designed for controlling the flow of fluid to and from a fluid motor that is utilized for raising and lowering an implement that is attached to the vehicle through draft arms. The control valve has an inlet opening which has a flow divider therein that divides the flow from a source of pressurized fluid into a plurality of flow paths which are connected to the reservoir. Each of the flow paths has a solenoid valve therein and each flow path is connected to a fluid motor through a branch path. Actuation of a first solenoid will divert fluid from the first flow path through a branch path into the hydraulic motor and actuation of additional solenoids will increase the amount of fluid that is delivered to the fluid motor through the branch path.

The system is also designed to be utilized with a one-way fluid ram which only has pressurized fluid supplied thereto for raising the implement and the lowering of the implement is accomplished by connecting the fluid motor to the reservoir and relying upon the forces applied by the implement to force the fluid from the ram. This control of fluid from the reservoir is again accomplished through a separate flow path in the control valve between the motor or ram and the reservoir with a solenoid actuatable to accommodate fluid flow.

DETAILED DESCRIPTION

Figure 1:
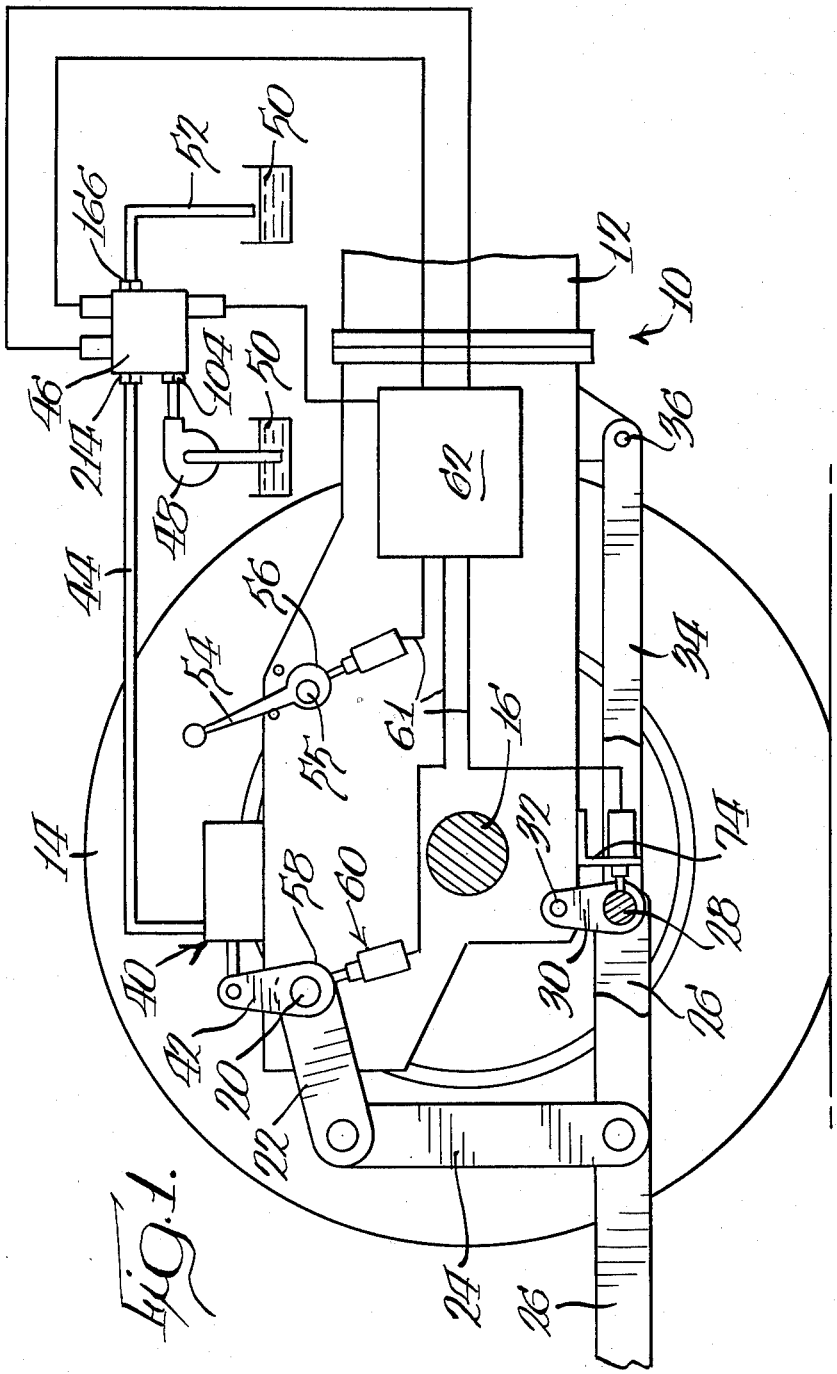
FIG. 1 is a fragmentary side elevation view, partly in section, showing a vehicle having a draft control system incorporated therein.

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the invention to the embodiment illustrated.

FIG. 1 of the drawings schematically illustrates a portion of a conventional tractor or vehicle 10 including a housing 12 supported on rear wheels 14 that are connected to opposite ends of a rear axle 16. A rock shaft 20 extends generally parallel to axle 16 and is rotatably supported on housing 12 that forms part of vehicle 10. Rock shaft 20 has a pair of rock arms 22 (only one being shown) fixed thereto and each rock arm is connected through a link 24 to a draft arm or link 26. An earthworking implement (not shown) is attached to the rear ends of the two draft arms while the forward ends are interconnected by a cross shaft or member 28. Cross shaft or member 28 is supported for movement with respect to vehicle 10 by a pair of transversely spaced links 30 (only one being shown) pivotally supported on vehicle 10 by pins 32. A spring mechanism or biasing mechanism 34 has one end secured to member or cross shaft 28 while the opposite end is connected to vehicle 10 by a pin 36. Biasing mechanism 34 is preferably of the type disclosed in Engelmann U.S. Pat. No. 3,375,876, assigned to the assignee of the present invention. Biasing mechanism 34 normally biases member 28 to a forward most position and accommodates rearward movement of member 28 as the draft load on the implement increases.

The position of rock shaft 20 is controlled by a hydraulic motor 40 connected to rock shaft 20 by an arm 42. Hydraulic fluid is supplied to motor 40 through a conduit 44 connected to a control valve 46 which has pressurized fluid supplied thereto by pump means 48 drawing fluid from a reservoir 50. Reservoir 50 is also connected to control valve 46 through a further conduit 52. Thus, pressurized fluid may be supplied to one end of hydraulic motor or ram 40 by actuation of the control valve 46. Alternatively fluid may be forced from hydraulic ram to the reservoir when the control valve is actuated. The fluid is forced from the ram by the weight of the implement.

The draft sensing system also incorporates a manual control lever 54 which is pivotally supported on vehicle 10 to set the desired position and/or draft load on the vehicle through circuitry that will be subsequently described. Control lever 54 has a member movable therewith for indicating the position of the control lever with respect to vehicle 10. In the illustrated embodiment, the movable member consists of a camming surface 56 that is eccentric with respect to the axis of pin 55 which supports control lever 54. Also, rock shaft 20 likewise has a camming surface 58 that is eccentric to the axis of the rock shaft and defines a member that is movable therewith to define the position of the rock shaft with respect to the vehicle.

The positions of the rock shaft 20, draft arms 26 and control lever 54 with respect to vehicle 10 are all sensed by sensing devices which are identical in construction to each other. The sensing devices vary continuous positive signals from an electronic control circuit fed through lines 61 and the electronic control circuit 62 combines the respective signals and produces a control signal that actuates control valve 46. Sensing devices 60 are preferably of the type disclosed in my co-pending application Ser. No. 556,587, filed Mar. 10, 1975.

Electronic control circuit 62 is preferably of the type disclosed in a co-pending application of Robert M. Haney Ser. No. 556,531, filed Mar. 10, 1975 and actuates control valve 46 through lines 63.

According to the present invention, control valve 46 of the present invention is designed to be able to vary the amount of fluid that is being supplied to hydraulic motor 40 dependent upon the magnitude of a change of position of rock shaft 20 that is required, as will be described later.

Figure 2:
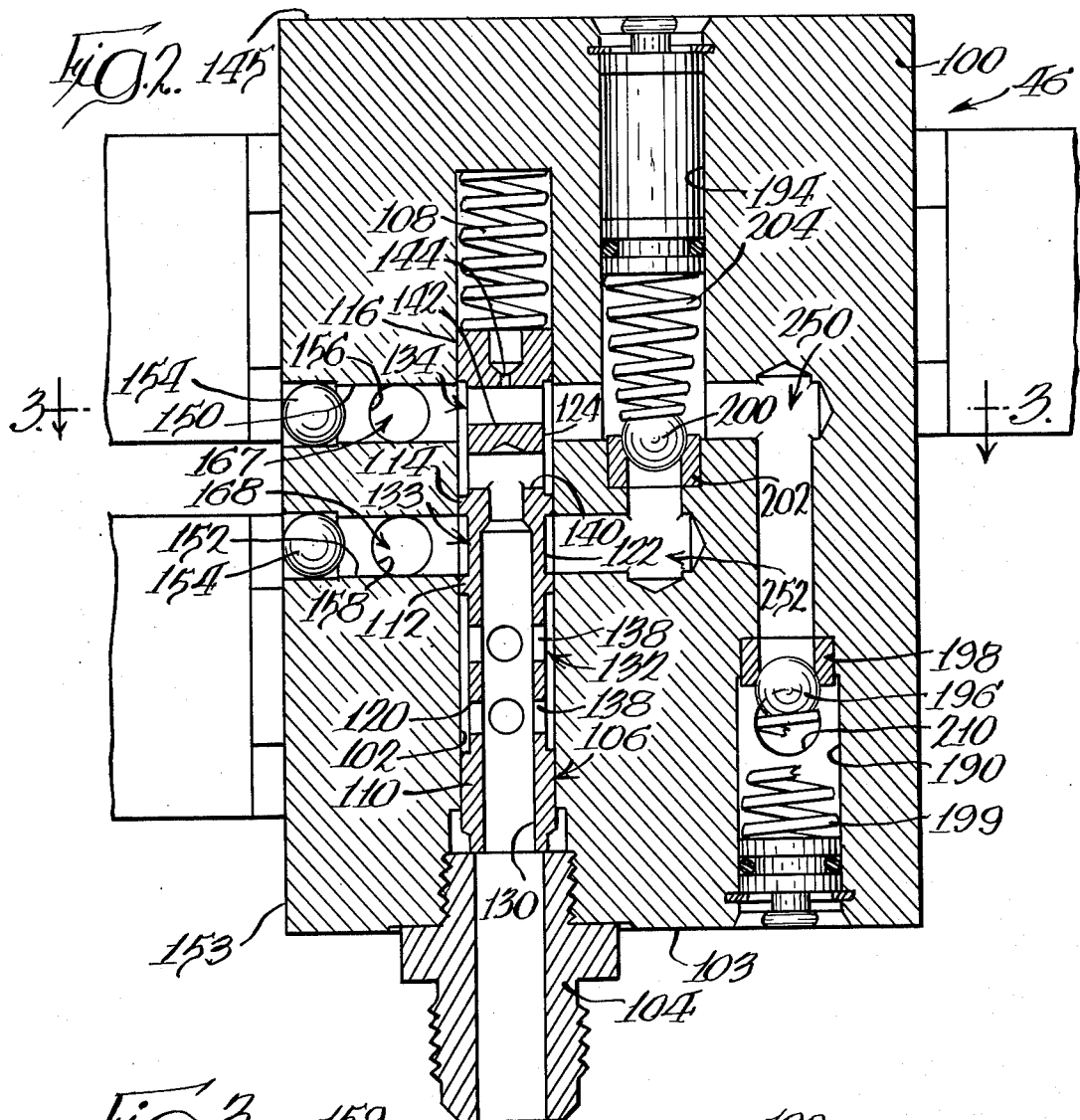
FIG. 2 is an enlarged sectional view of a lower portion of the control valve shown in FIG. 1.
Figure 3:
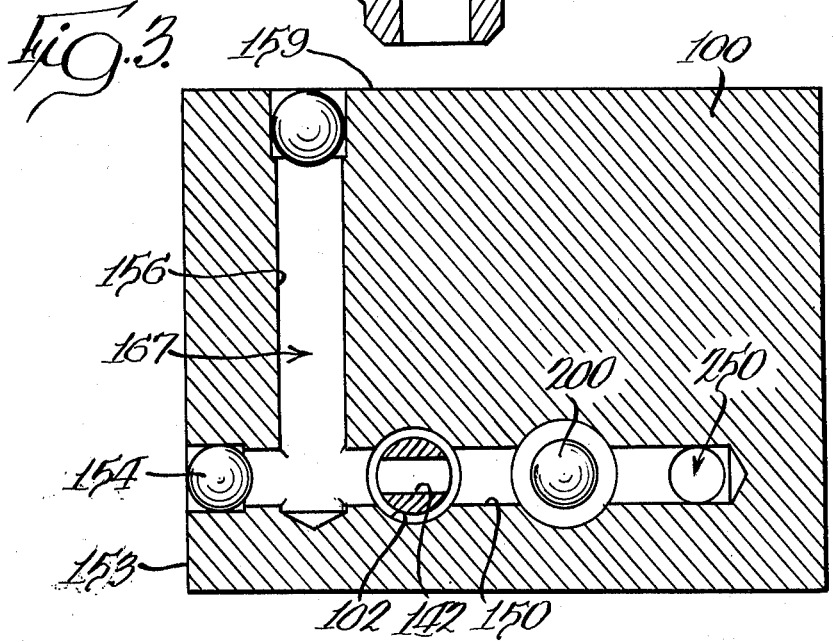
FIG. 3 is a transverse sectional view, as viewed along line 3—3 of FIG. 2.
Figure 4:
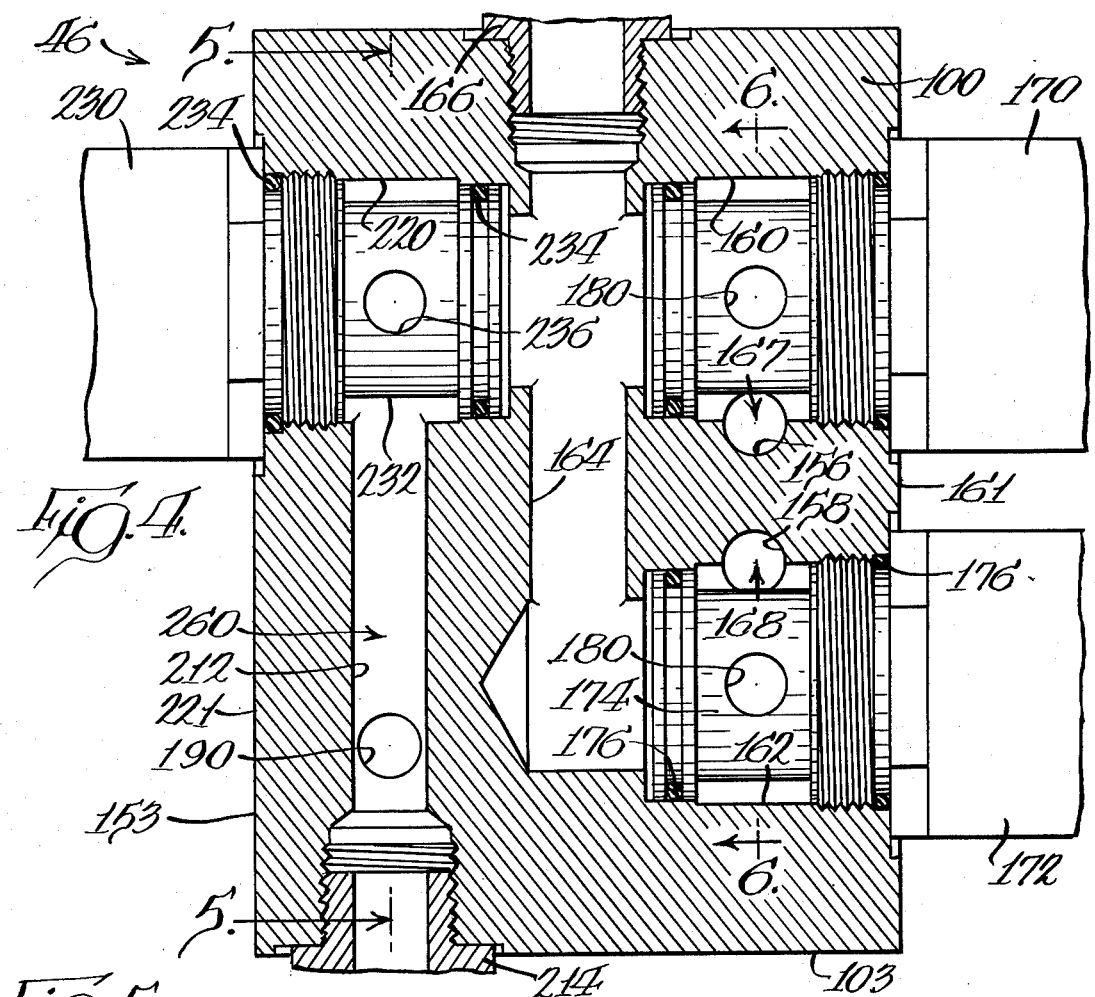
FIG. 4 is a sectional view similar to FIG. 2 showing a different portion of the control valve.

More specifically, referring to FIGS. 2 and 4, control valve 46 includes a valve housing or body 100 having an input opening 102 extending from surface 103. A source of pressurized fluid, defined by pump means 48, is connected to the inlet opening through a threaded coupling 104. Inlet opening 102 has a flow divider 106 slidably supported therein and biased into a first position by a spring or biasing means 108. This first position is clearly illustrated in FIG. 2.

Flow divider means or spool 106 has a plurality of axially spaced lands 110, 112, 114 and 116 which provide axially spaced seals between the flow divider spool 106 and opening or bore 102. Flow divider or spool 106 has reduced portions 120, 122 and 124 defined between the adjacent pairs of lands which define chambers 132, 133 and 134 within bore 102. Flow divider or spool 106 also has an axial bore 130 extending through a major portion of spool 106 and bore or opening 130 is in communication with chambers 132 and 134 through openings 138 and 140.

A further cross bore 142 is in communication with chamber 134 and in turn is in communication with the opposite end of bore 102 (having spring 108 therein) through a reduced orifice 144. The size of the various openings 138 and 140, will be discussed in further detail later on.

Valve housing 100 also has a pair of bores 150 and 152 extending from outer surface 153 and intersecting bore 102 at axially spaced locations. The outer ends of the respective bores are sealed with balls 154. These bores define the first portions of the first and second flow paths, as will be described later.

Housing 102 has a further pair of bores 156, 158 extending from surface 159 and bore 156 intersects with bore 150 while bore 158 intersects with bore 152. Referring to FIG. 4, it will be noted that bore 156 intersects with an enlarged opening 160 extending from surface 161 of housing 100 while bore 158 intersects with another enlarged opening 162 extending from surface 161 of housing 100. Enlarged openings 160 and 162 intersect with a further bore 164 that has a coupling 166 at the outer end thereof for connecting conduit 52 to provide the connection between control valve 46 and reservoir 50.

Summarizing the portion of the valve so far described, bore 102 defines an inlet opening which is connected to a source of fluid pressure through coupling 104 and has a flow divider means or spool 106 therein. Flow divider spool 106 divides the flow from the source and delivers it to two different flow paths. First flow path 167 is defined by portions of bores 150, 156, 164 and enlarged opening 160 while second flow path 168 is defined by portions of bores 152, 158 and 164 and enlarged opening 162.

Opening 160 has a first solenoid valve means 170 cooperating therewith while second opening 162 has a second solenoid valve means 172 associated therewith. Each of the solenoid valve means includes a fixed member 174 that is threaded into the opening and has a reduced portion 176 intermediate opposite ends thereof. The inner and outer ends of member 174 have suitable O-rings 176 that produce fluid seals. Each member 174 also has a cross bore 180 and an axial bore 182 intersecting cross bore 180. Thus, bore 156 is in communication with bore 164 through bores 180 and 182 in member 174 of first solenoid valve means 170 while bore 158 is in communication with bore 164 through cross bore 180 and axial bore 182 in second solenoid valve means 172.

Solenoid valve means 170 and 172 each have a plunger 184 reciprocated in associated axial bore 182. Solenoid valve means 170 and 172 are of the "normally open" type to accommodate flow between inlet opening 102 and reservoir or sump 50. However, when actuated, plungers 184 move outwardly and block the flow of fluid through bores 182.

Returning now to FIG. 2, it will be noted that valve housing 100 has a further bore 190 extending from housing surface 103 with its inner end intersecting bore 150. Also, a further bore 194 extends from oppostie surface 195 of housing 102 and intersects bores 150 and 152. Bore 190 has check valve means therein consisting of a ball 196 biased into engagement with a valve seat 198 by a spring 199. Likewise, bore 194 has check valve means therein consisting of ball 200 spring biased into engagement with a valve seat 202 by spring 204. The purpose of the check valve or unidirectional valve means will be described later.

Figure 5:
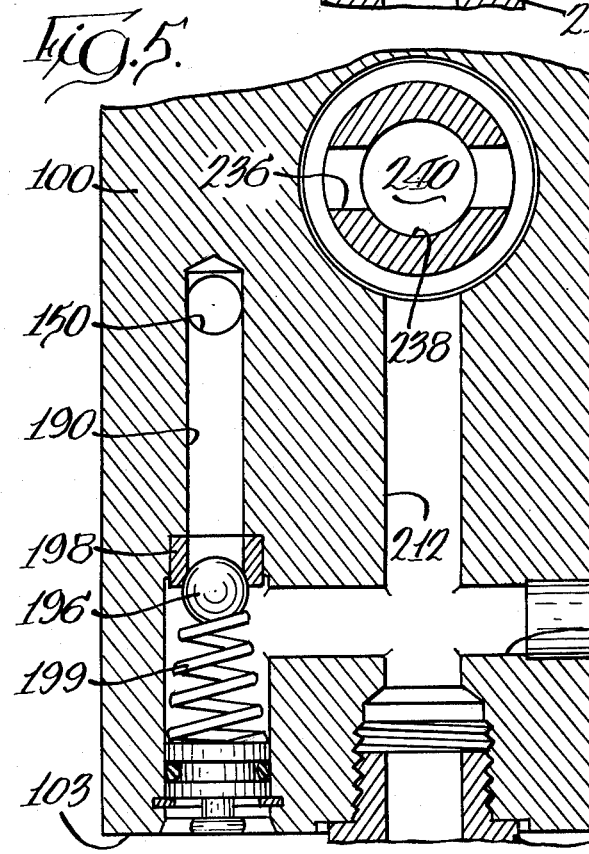
FIG. 5 is a sectional view as viewed along line 5—5 of FIG. 4.
Figure 6:
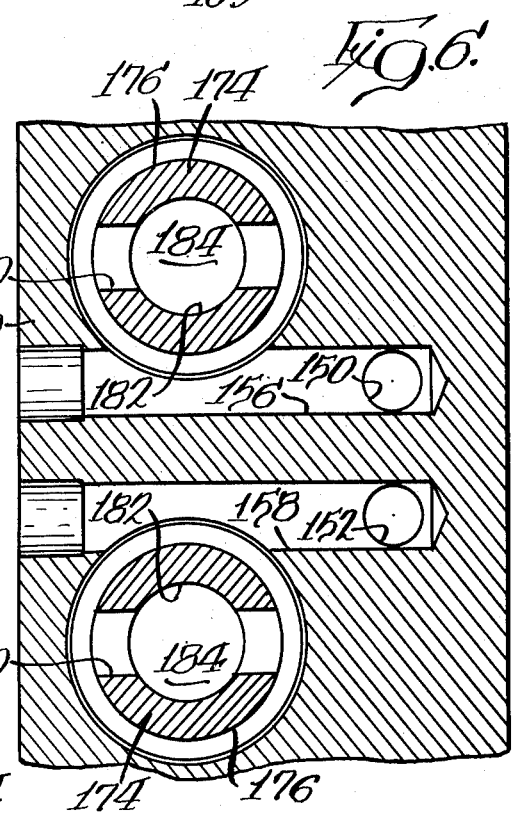
FIG. 6 is a sectional view as viewed along line 6—6 of FIG. 4.

Referring particularly to FIG. 5, it will be noted that a further bore 210 extends from surface 211 of valve body 100 and inersects bore 190 below ball check 196. Also, a further bore 212 extends from surface 103 of valve body 100 and intersects bore 210 intermediate opposite ends thereof. The outer end of bore 212 has a coupling 214 threaded therein for connecting conduit 44 to control valve 46.

The inner end of bore 212 terminates at an enlarged opening 220 extending from surface 221 of housing or valve body 100 and the iner end of opening 220 is in communication with bore 164 that is attached to reservoir 50. Enlarged opening 220 has a third solenoid valve means 230 threadedly received therein with a member 232 extending from solenoid 230 and having O-rings 234 at the outer and inner ends thereof which provide seals between member 232 and opening 220. Member 230 has a cross bore 236 (FIGS. 4 and 5) and an axial bore 238 which intersects cross bore 236. A plunger 240 is again reciprocated in axial bore 238 of solenoid valve means 230. Solenoid valve means 230 "normally closed" which means that plunger 240 is extended to block cross bore 236 and prevent flow from bore 212 to reservoir or sump 50.

Considering FIGS. 2, 4 and 5, it will be noted that bores 190, 210 and 212 as well as cross bore 236 and axial bore 238 define a main branch path 250 between the first flow path 167 and fluid ram 40 while a portion of bore 152 and the inner end portion of bore 194 define an auxiliary branch path 252 which connects the second flow path 168 to main branch path 250. Auxiliary branch path 252 and main branch path 250 are considered to define branch path means between flow paths 167, 168 and hydraulic motor 40. Also, bore 212, cross bore 236 and axial bore 238 define a third flow path 260 between fluid motor 40 and reservoir 50 with solenoid valve means 230 located in the flow path and actuatable to control flow between fluid motor 40 and reservoir 50.

As illustrated in FIG. 1, fluid motor 40 includes a hydraulic one-way ram consisting of a fluid cylinder and a piston rod assembly slidable in the cylinder with conduit 44 connected to the rod end of the cylinder.

The operation of the unique control valve 46 will be considered in conjunction with the remainder of the draft control system shown in FIG. 1. Assuming that the implement attached to draft arms 26 is in the raised position and pump 48 is operating, pressurized fluid will be delivered through coupling 104 (FIG. 2) and will shift flow divider spool 106 sufficiently to have chamber 132 in communication with bore 152 and chamber 134 in communication with bore 150. Assuming that both plungers 184 of the respective solenoid valve means 170 and 172 are in the retracted position, the flow of fluid under pressure is unobstructed through the plurality of flow paths between inlet opening 102 and reservoir 50. Thus, all of the fluid received into inlet opening 102 will be automatically returned to the reservoir because there will not be sufficient pressure in main branch path 250 to cause check valve 196 to open.

If the operator now actuates control lever 54 to produce a desired positional setting for the implement, sensing device 60 associated with control lever 54 will deliver a signal to electronic control circuit 62 which will produce a resultant output signal to actuate solenoid 230 and retract plunger 240 in third flowpath 260. Thus, conduit 44 will be in direct communication with reservoir 50 through flow path 260. The weight of the implement on rock arm 22 will produce sufficient forces on the fluid in the head end of the cylinder of fluid motor 40 to force the fluid from the cylinder to reservoir 50. This force, resulting in pressurization of the fluid within the cylinder of fluid motor 40 will be increased when the implement, such as a plow, enters the ground and is pulled downward.

As rock shaft 20 rotates, the rotational movement will change the signal through the associated sensing device which signal is received by electronic control circuit 62. Also, when the implement enters the ground, member 28 will be moved rearwardly indicating an increase in draft load on the vehicle which will change the signal from the associated sensing device 60 and this signal will also be received by electronic control circuit 62. When the implement reaches the desired positional setting of control lever 54, solenoid valve means 230 will be de-energized and plunger 240 will block flow path 260.

Assuming now that there is an increase in draft load on draft arms 26, such increase in draft load will shift member 28 rearwardly and change the signal to electronic control circuit 62 which will produce a control signal to actuate solenoid 170. Actuation of solenoid 170 will block the flow of fluid through the first flow path and direct this fluid through main branch path 250, causing valve 196 to open to direct fluid to fluid motor 40 and raise the implement. When the implement is raised sufficiently to reduce the draft load to the desired magnitude, solenoid valve means 170 will be deenergized and the flow of fluid will be through first flow path 167 to reservoir 50.

Assuming that a major change in positional setting is to be made, such as when the control lever is moved to a neutral position to raise the implement out of the ground, it is at this time desirable to have a substantial amount of fluid available for delivery to fluid ram or motor 40 so that the implement is raised rapidly. This is automatically accomplished by electronic control circuit 62. In this situation, both solenoid valve means 170 and 172 are actuated and all of the flow of fluid from pump 48 is directed to the branch path means defined by main branch path 250 and auxiliary branch path 252. Of course, when the implement is repositioned to the desired position, both solenoid valve means 170 and 172 will be deenergized thereby connecting inlet opening 102 to reservoir 50 through the first and second flow paths.

As will be appreciated from the above description, the control valve of the present invention provides a unique way in which different amounts of fluid can be directed to a fluid motor under different operating conditions. The amount of fluid delivered through the respective flow paths will be determined by the relative sizes of the respective openings 138 and 140. For example, the respective openings may be sized so that a majority of the flow from pump 48 is directed through the second flow path 168 and only a small amount of flow is directed to first flow path 167. This distribution of flow allows for making extremely minute adjustments without having the unit "overtravel" and still be able to make major adjustments rapidly.

The control valve of the present invention is extremely simple in construction and has a minimum number of relatively movable parts. This has a distinct advantage in the manufacture of the unit as well as the maintenance thereof. For example, the only movable elements in the valve body itself are the flow divider spool and the two check valves along with the plungers of conventional solenoid valve means.

It will also be appreciated that, while only two flow paths have been shown for varying the amount of fluid being delivered to fluid motor 40, any such number of flow paths may be incorporated into the system to provide greater flexibility in varying the fluid flow through the control valve.

Also, while the fluid motor 40 has been shown as a piston and cylinder arrangement, other types of motors could be utilized or the motor 40 could be of the double acting type wherein fluid under pressure is supplied to both ends of the cylinder to provide positive control in either direction of movement.

What is claimed is:

1. In a draft control system for a vehicle having an implement supported thereon, a fluid motor for raising and lowering said implement, a hydraulic fluid circuit for supplying fluid to said motor, said fluid circuit including, a control valve, a reservoir, a source of pressurized fluid, and conduit means connecting said source, reservoir and motor to said control valve, said control valve having an inlet opening with said source connected thereto, a flow divider in said inlet opening, said control valve having first and second flow paths between said inlet opening and said reservoir, first and second solenoid valve means in the respective flow paths, branch path means between said first and second flow paths and said motor, said solenoid valve means being individually actuatable to interrupt flow through the associated flow path and direct said flow through said branch path means to said motor, said first solenoid valve means, when actuated alone, directing flow from said fist fluid flow path to said fluid motor to raise said implement at a first rate and both said solenoid valve means, when simultaneously actuated, simultaneously directing fluid from said first and second flow paths to said fluid motor to raise said implement at a second rate greater than said first rate.

2. A draft control system as defined in claim 1, in which said fluid motor is a fluid cylinder and a piston rod assembly slidable in said cylinder and said branch path means is connected to one end of said cylinder.

3. A draft control system as defined in claim 2, in which said control valve has a further flow path between said cylinder and said reservoir and a further solenoid valve means in said further flow path actuatable to control flow between said cylinder and said reservoir.

4. In a draft control system for a vehicle having an implement supported thereon, a fluid motor including a fluid cylinder and a piston rod assembly slidable in said cylinder for raising and lowering said implement, a hydraulic fluid circuit for supplying fluid to said cylinder, said fluid circuit including, a control valve, a reservoir, a source of pressurized fluid, and conduit means connecting said source, reservoir and cylinder to said control valve, said control valve having an inlet opening with said source connected thereto, a flow divider in said inlet opening, said control valve having first and second flow paths between said inlet opening and said reservoir, first and second solenoid valves in the respective flow paths, branch path means between said flow paths and one end of said cylinder, said branch path means including a main branch path between said first flow path and said cylinder and an auxiliary branch path connecting said second flow path to said main branch path, said auxiliary branch path having a unidirectional valve preventing flow from said main branch path to said auxiliary branch path, said solenoid valves being individually actuatable to interrupt flow through the associated flow path and direct said flow through said branch path means to said cylinder so that actuation of said first solenoid will move said piston rod to raise said implement at a first rate and actuation of both solenoids will move said piston rod to raise said implement at a second rate greater than said first rate.

5. A draft control system as defined in claim 4, in which said main branch path has a second unidirectional valve therein preventing flow from said cylinder through said main branch path and in which said control valve has a third flow path between said one end of said cylinder and said reservoir, said third flow path having a third solenoid therein, said third solenoid normally preventing flow through said third flow path and being actuatable to accommodate flow through said third flow path from said cylinder to said reservoir.

* * * * *